United States Patent
Chao et al.

(10) Patent No.: US 7,154,214 B2
(45) Date of Patent: Dec. 26, 2006

(54) STRUCTURE OF A COPLANAR GATE-CATHODE OF A TRIODE CNT-FED AND METHOD OF MANUFACTURING SAME

(75) Inventors: Ching-Hsun Chao, KaoHsiung (TW); Jane-Hway Liao, Hsin Chu Hsien (TW); Jyh-Rong Sheu, Hsin Chu (TW); Yu-Yang Chang, Tainan (TW); Cheng-Chung Lee, Taitung (TW)

(73) Assignee: Industrial Technology Research Institute, Hsinchu (TW)

( * ) Notice: Subject to any disclaimer, the term of this patent is extended or adjusted under 35 U.S.C. 154(b) by 230 days.

(21) Appl. No.: 10/863,279

(22) Filed: Jun. 9, 2004

(65) Prior Publication Data

US 2005/0253501 A1    Nov. 17, 2005

(30) Foreign Application Priority Data

May 11, 2004    (TW)  ............................... 93113127 A

(51) Int. Cl.
*H01J 1/14*    (2006.01)
(52) U.S. Cl. ............... 313/351; 313/309; 313/311; 313/495; 313/346 R
(58) Field of Classification Search ............... 313/494
See application file for complete search history.

(56) References Cited

U.S. PATENT DOCUMENTS

| | | | |
|---|---|---|---|
| 6,091,188 A * | 7/2000 | Tomihari et al. | 313/336 |
| 6,525,453 B1 * | 2/2003 | Cheng et al. | 313/309 |
| 6,741,039 B1 * | 5/2004 | Lee et al. | 313/310 |
| 6,787,992 B1 * | 9/2004 | Chuman et al. | 313/505 |
| 6,858,981 B1 * | 2/2005 | Cho et al. | 313/495 |
| 2002/0036452 A1 * | 3/2002 | Muroyama et al. | 313/310 |
| 2002/0079802 A1 * | 6/2002 | Inoue et al. | 313/309 |
| 2003/0042834 A1 * | 3/2003 | Dean et al. | 313/309 |
| 2003/0122118 A1 * | 7/2003 | Lee et al. | 313/310 |
| 2003/0184203 A1 * | 10/2003 | Inoue et al. | 313/309 |
| 2005/0184642 A1 * | 8/2005 | Oh et al. | 313/495 |
| 2005/0264156 A1 * | 12/2005 | Hwang | 313/309 |

\* cited by examiner

*Primary Examiner*—Nimeshkumar D. Patel
*Assistant Examiner*—Peter Macchiarolo
(74) *Attorney, Agent, or Firm*—Troxell Law Office PLLC

(57) ABSTRACT

A structure of a coplanar gate-cathode of triode CNT-FED and a manufacturing method thereof by Imprint Lithography and ink jet. The structure includes a substrate, a plurality of cathode layers, a plurality of gate extended layers, a plastic dielectric layer, a plurality of dielectric openings, and a plurality of gate electrodes. The plurality of cathode layers and the plurality of gate extended layers are coplanar, and formed on the substrate by Imprint Lithography and the plurality of dielectric openings are made by Imprint Lithography. The gate electrode, made by ink jet or screen print, can be extended through the plastic dielectric layer to the gate extended electrode to feature the coplanar gate-cathode.

6 Claims, 8 Drawing Sheets

STRUCTURE OF A COPLANAR GATE-CATHODE OF A TRIODE CNT-FED AND METHOD OF MANUFACTURING SAME

FIELD OF TECHNOLOGY

The present inventions relate to a structure of a coplanar gate-cathode of a triode CNT-FED and a method of manufacturing same and more particularly to a method of making the triode CNT-FED by Nano-Imprint Lithography and ink jet.

BACKGROUND OF THE INVENTION

The lighting principles of a Carbon Nano Tube Field Emission Display (hereafter CNT-FED) and CRT are the same: electron beam hitting the fluorescent particles. Thus, the CNT-FED is featured for high quality, high brightness, high reaction and durable and has advantages of being light and thin and having low power consumption as does the CRT.

In FIG. 1, a standard triode CNT-FED is shown having a dielectric layer 13 and a cathode layer 12 are stacked on a substrate 11 consecutively. A plurality of dielectric openings 131, the material of loading CNT to be the emitting source 15, is formed on the dielectric layer 13, the bottoms of which reach the surface of cathode layer 12. Besides, an anode layer 22 is located on an upper substrate 21 and some fluorescent particles 23 are on the anode layer 22. A separator (not shown) is arranged between the upper and lower substrates to locate the distance thereof. Circuits are arranged on the cathode layer 12, a gate electrode 14 and the anode layer 22 and connected to an outside power supply (not shown). Then, a CNT-FED is formed by vacuum and package. The method of operations of the CNT-FED is that on the cathode layer 12, the emitting source 15 emits electrons induced by the high voltage provided by the anode layer 22. When the fluorescent particles 23 on the surface of the anode layer 22 is hit by the electron beam to display, the require voltage for inducing electrons from the emitting source 15 is lowed by the gate electrode 14 in order to control the switch of the FED by the low voltage.

In FIG. 2, a top view of the structure of the lower substrate (i.e. cathode layer and gate included only) of triode CNT-FED with matrix arrangement is shown. Obviously, the cathode layer 12 and the gate electrode 14 are arranged by crisscrossing and are layered. It needs twice to connect the cathode layer 12 and the gate electrode 14 to the outside power supply and is too hard to control the process because of the different lengths of circuits. Thus, the cost of manufacturing is increased substantially.

Furthermore, there are two conventional processes of manufacturing triode CNT-FED. One is a conventional thin film process of manufacturing semiconductor, the disadvantages of which are the complex processes, high cost and the lithography is not applicable when in the age of nano-line width. The other one is thick film screen print that features a lower cost but is unstable to control and the resolution is restricted to the thickness of the dielectric layer of the thick film.

Technology of Nano-Imprint Lithography (hereafter NIL) has been used in the semiconductor field since the paper written by Prof. Stephen Chou in 1996 of which the principle is similar to sigillography. Referring to drawings FIG. 3A through FIG. 3C, the standard NIL applied to the field of semiconductor is shown. First, the printed patterns are made on a mold 31 by lithography and etching methods (such as mask, electron beam etching, focused ion beam etching) to form patterns on the surface of the mold 31 and plastic material 32, such as Polymenthyl methacrylate (PMMA), is coated on the substrate 33. Then, the printed patterns are stamped on the surface of the plastic material 32 during appropriable temperature and pressure to transfer the patterns from the mold 31 to the plastic material 32. The advantages of replacing the conventional lithography process by NIL are: the manufacturing of mold can be made by e-beam to be the degree of nano-resolution and the process of moldboard stamping can be improved; besides, the mold can be reused and has a longer period than the conventional mask reducing the cost of manufacturing.

The present invention has a structure of a coplanar gate-cathode of a triode CNT-FED by a NIL to produce a reliable, easy and simple to use, and low cost triode CNT-FED.

SUMMARY

An object of this present invention is to provide a structure of a coplanar gate-cathode of a triode CNT-FED and a manufacturing method thereof simplifying the process of manufacturing the outside power supply circuits of gate and cathode layer.

Another object of the invention is to provide a structure of coplanar gate-cathode of triode CNT-FED and the manufacturing method thereof of which the cathode layer and gate electrode are made by an Imprint Lithography and ink jet to improve the resolution, simplifying the process and lowering the cost of the CNT-FED.

To achieve the goal, the present invention provides a structure of the coplanar gate-cathode of triode CNT-FED including: a substrate, a plurality of cathode layers, a plurality of gate extended layers, a plastic dielectric layer, a plurality of dielectric openings, and a plurality of gate electrodes. The plurality of cathode layers and the plurality of gate extended layers are coplanar and the plurality of dielectric openings is formed from a plurality of trenches formed on the surface of the plastic dielectric layer.

To achieve the goal of this invention, the process of manufacturing the structure of coplanar gate-cathode of triode CNT-FED includes:
a. providing a substrate,
b. forming a plurality of cathode layers and gate extended layers on the substrate by imprint,
c. forming a plastic layer on the plurality of cathode layers and gate extended layers,
d. forming a plurality of dielectric openings and a plurality of gate conducting wire conduits, wherein the dielectric openings conduct to the surface of the cathode layers and the conduits conduct to the surface of the gate extended layers,
e. filling the materials of CNT in the bottom of the dielectric opening, and
f. forming a plurality of gate electrodes on predetermined region of the plastic dielectric layer and the filling the same material as the gate electrodes in the gate conducting wire conduits so the gate electrodes can connect the gate extended layers by the gate conducting wire conduits.

BRIEF DESCRIPTION OF THE DRAWINGS

The above and other objects and the advantages and features of the present inventions will be more apparent from the detailed description of preferred embodiments, taken in conjunction with the drawings.

DETAILED DESCRIPTION OF PREFERRED EMBODIMENTS

The nature, feature and function of the present inventions will be more apparent from the following description of preferred embodiments.

Figure 1:
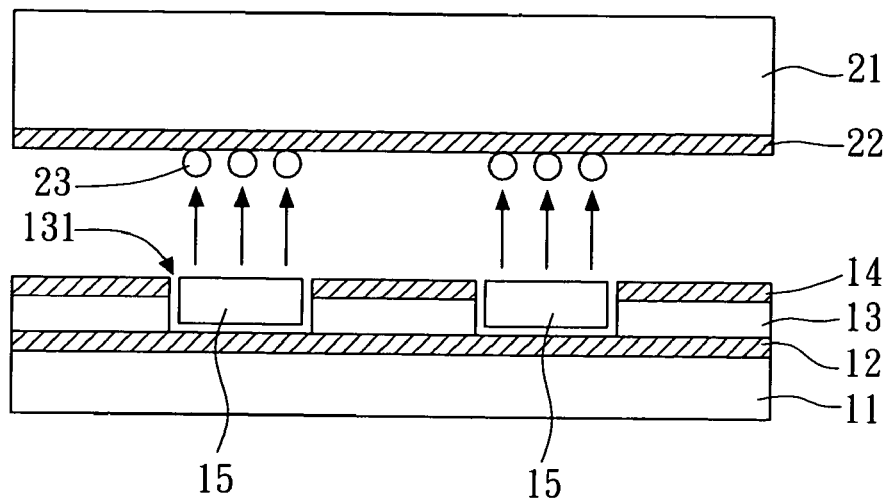
FIG. 1 is an illustrative view of the structure of standard triode CNT-FED.
Figure 2:
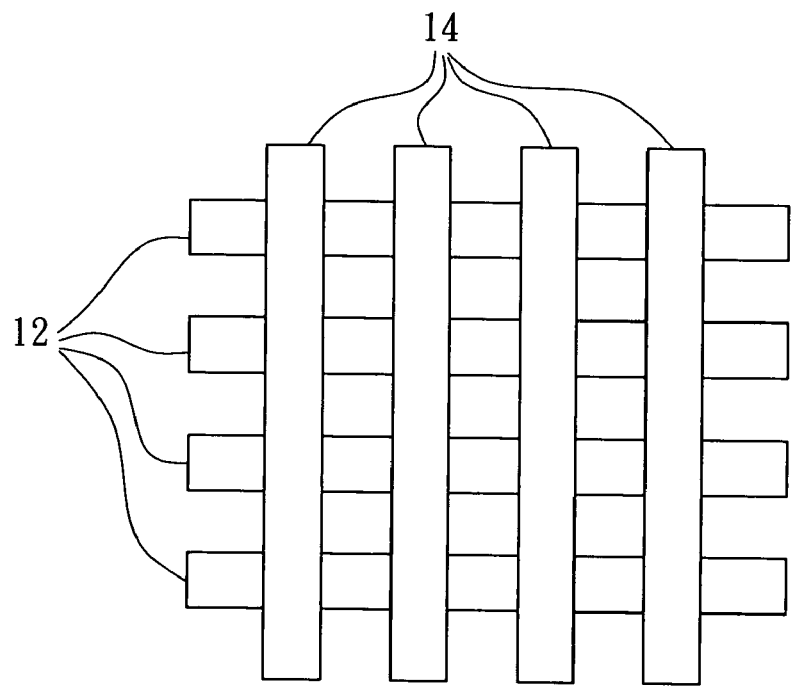
FIG. 2 is a top view of the structure of the lower substrate of triode CNT-FED with matrix arrangement.
Figure 3A:
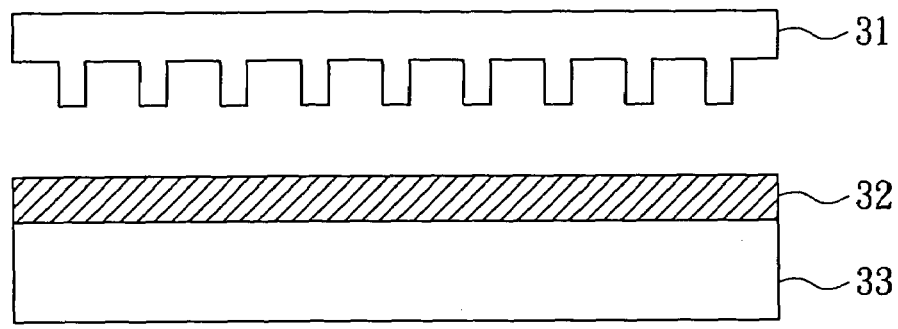
FIG. 3A to FIG. 3C are illustrative views of the manufacturing process of imprint mold of the best embodiment of the present invention in use.
Figure 3B:
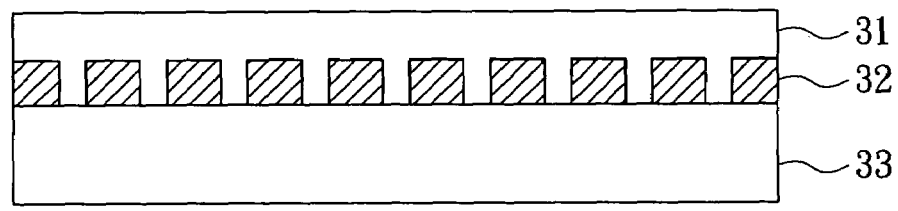
Figure 3C:
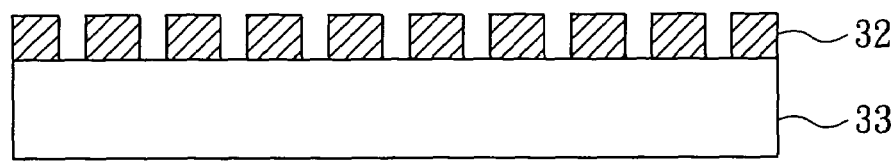
Figure 4A:
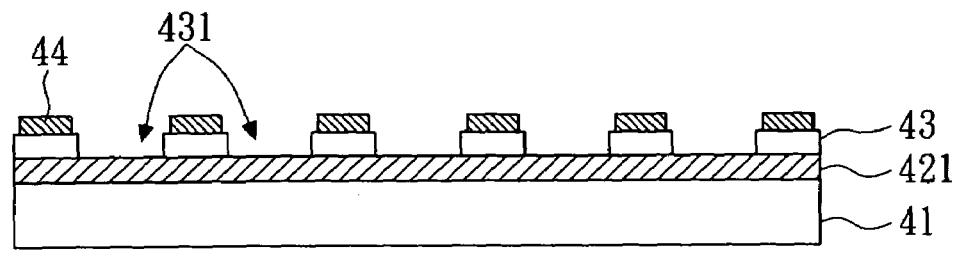
FIG. 4A is a cross-sectional drawing of the structure of coplanar gate-cathode of triode CNT-FED of the present invention in use.
Figure 4B:
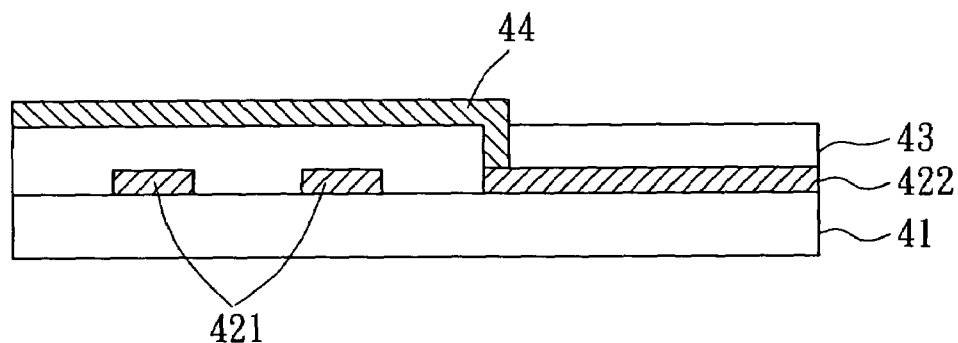
FIG. 4B is a cross-sectional drawing of the 90 degrees rotation structure of coplanar gate-cathode of triode CNT-FED of the present invention in use.

Referring to FIG. 4A, a cross-sectional drawing of the structure of coplanar gate-cathode of triode CNT-FED of the best mode of the present invention is shown and FIG. 4B is the same structure as shown in FIG. 3A after being rotated 90 degrees. The structure of the present invention includes a substrate 41, a plurality of cathode layers 421, a plurality of gate extended layers 422, a plastic dielectric layer 43, a plurality of dielectric openings 431, and a plurality of gate electrodes 44.

The coplanar cathode layers 421 and gate extended layers 422 are located on the substrate 41 and the plastic dielectric layer 43 is formed on the cathode layers 421 and gate extended layers 422, the materials of which are plastic. Colloid mixed with silver particles is preferred. The plastic dielectric layer 43 can be made of a plastic material too, such as Polymenthyl methacrylate (PMMA). The openings 431 are formed from a plurality of trenches forming downward on the surface of the plastic dielectric layer 43, and the bottoms of openings 431 reach the surface of cathode layer 421 to fill the materials of CNT. Then, a plurality of gate electrodes 44 are formed on the plastic dielectric layer 43 and extend to penetrate the inner part of plastic dielectric layer 43 to connect the gate extended layers 422 separately. The gate electrode 44 is made of the same material as gate extended layer 422, such as colloid composed of silver particles. Thus, the uppermost gate electrodes 44 are coplanar with the cathode layers 421 by the connecting of the inner circuit of gate electrodes 44.

Figure 4C:
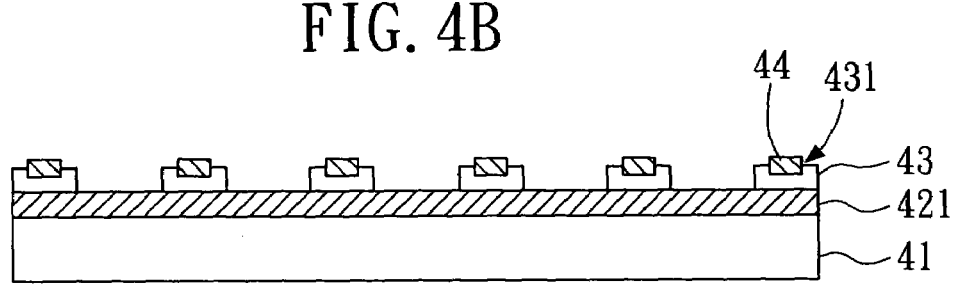
FIG. 4C is a cross-sectional drawing of the structure of coplanar gate-cathode of triode CNT-FED of another embodiment of the present invention in use.
Figure 5A:
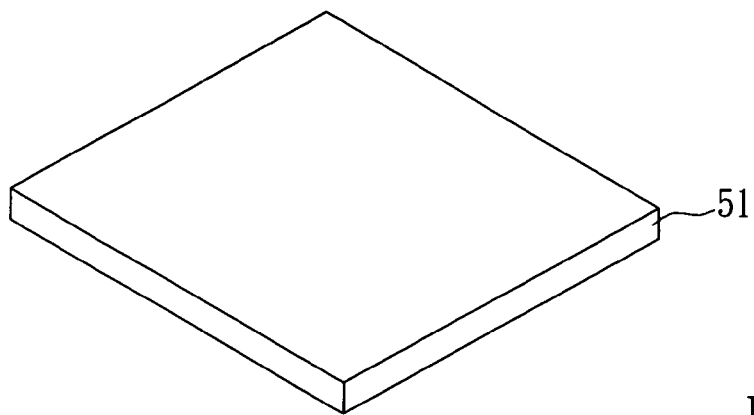
FIG. 5A to FIG. 5E are illustrative views of the structure of coplanar gate-cathode of triode CNT-FED of the best embodiment of the present invention in use.
Figure 5B:
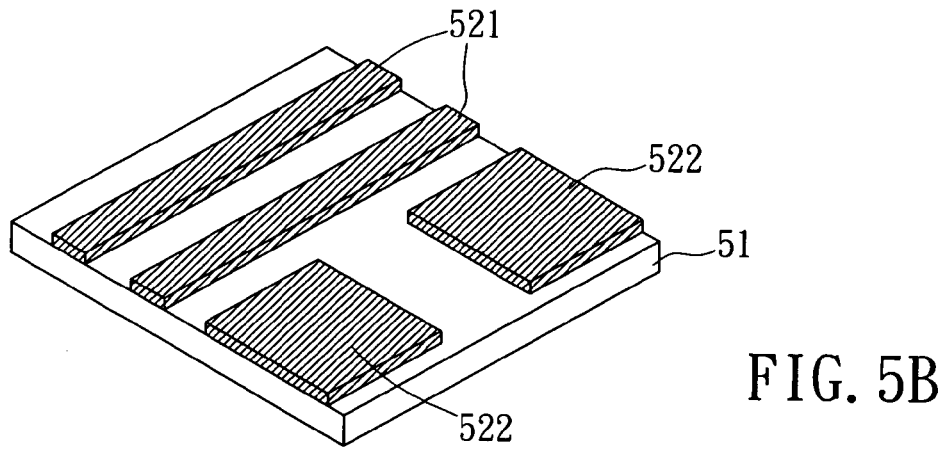
Figure 5C:
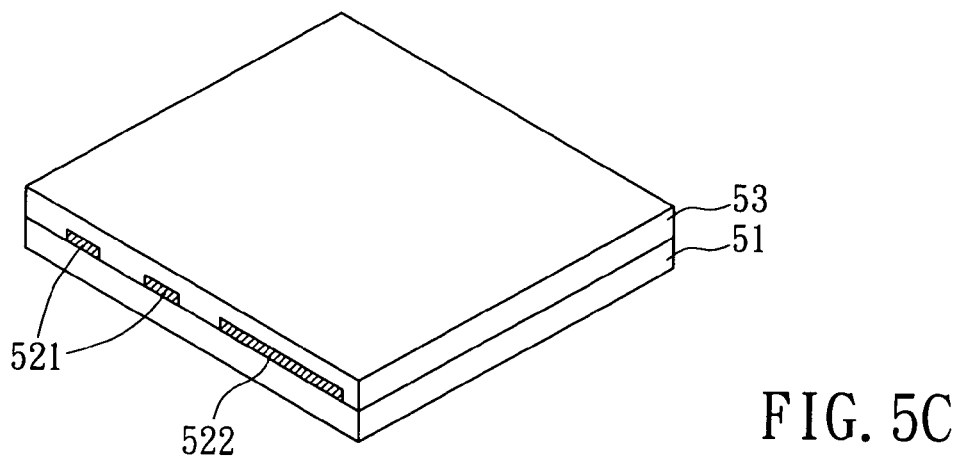
Figure 5D:
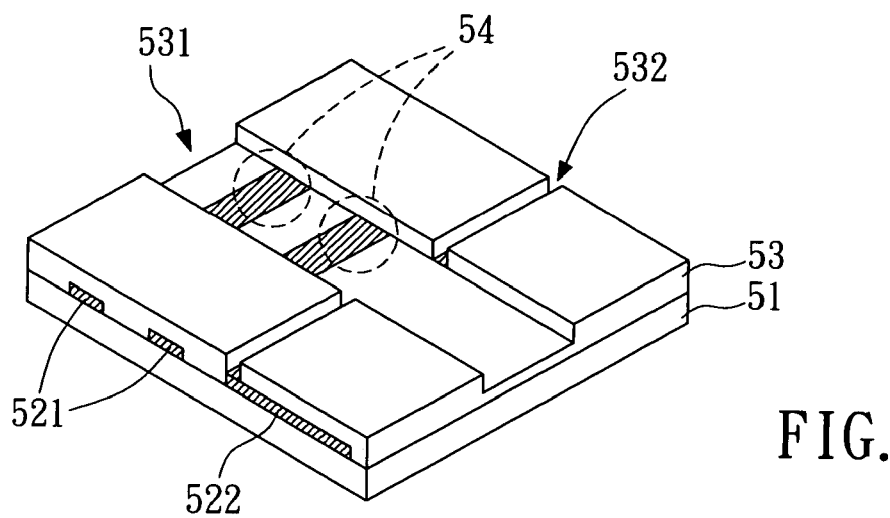
Figure 5E:
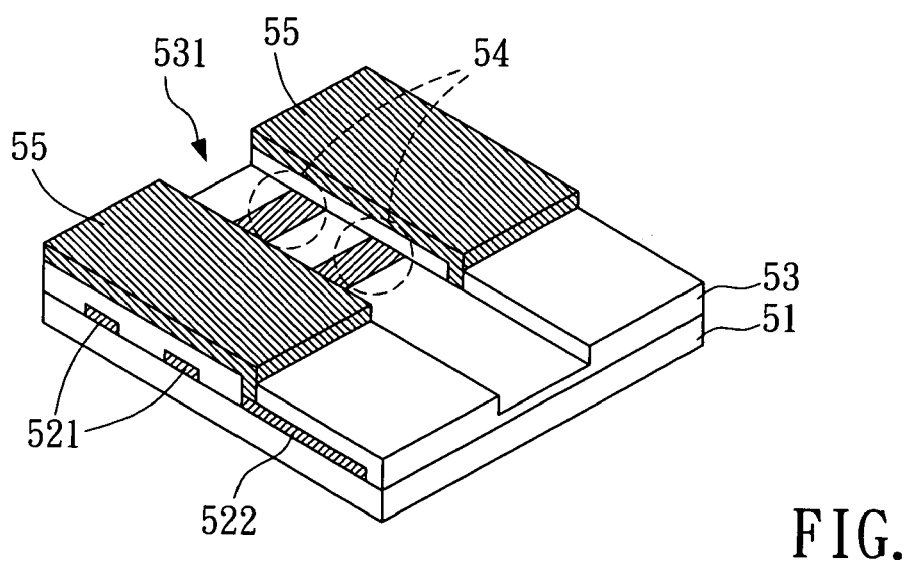
Figure 5F:
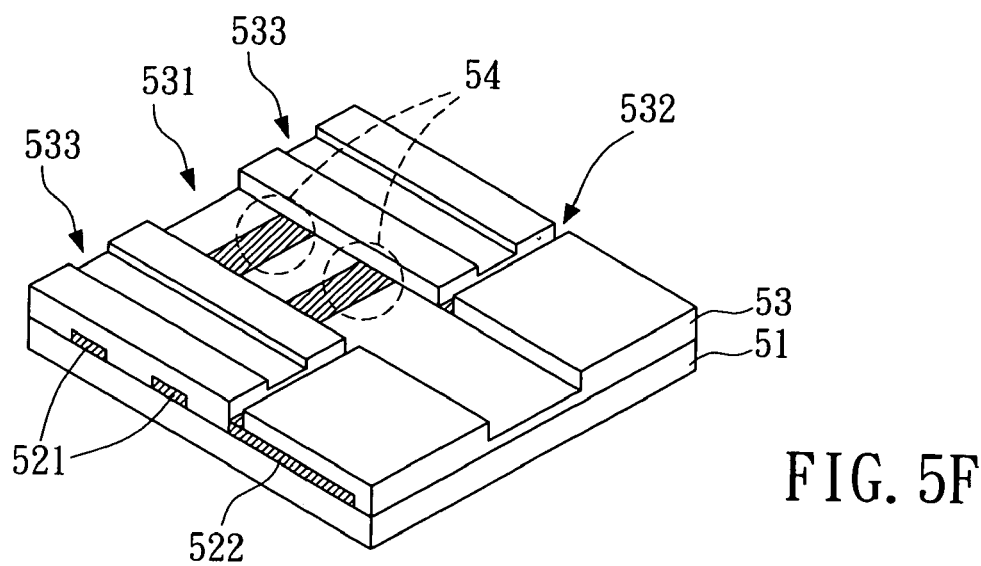
FIG. 5F and FIG. 5G are an illustrative views of the structure of coplanar gate-cathode of triode CNT-FED of another embodiment of the present invention in use.
Figure 5G:
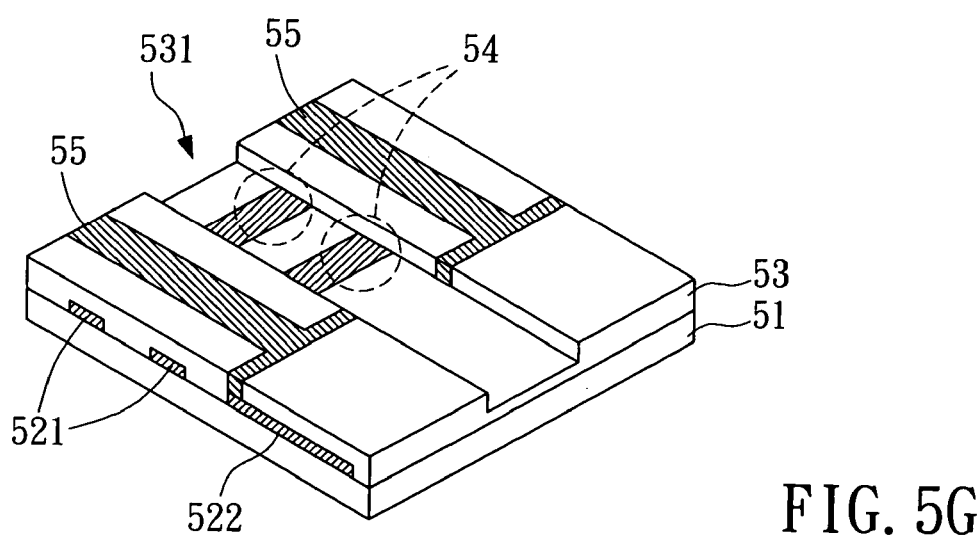
Figure 6A:
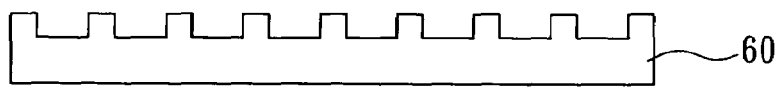
FIGS. 6A to 6E are illustrative views of the process of manufacturing cathode layers and gate extended layers by imprint of a preferred embodiment of the present invention in use.
Figure 6B:
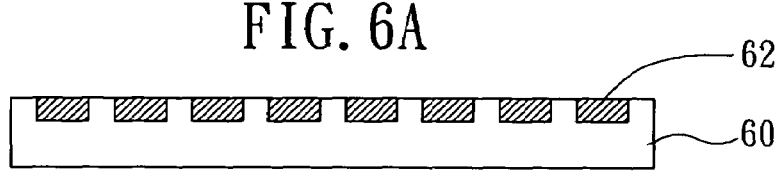
Figure 6C:
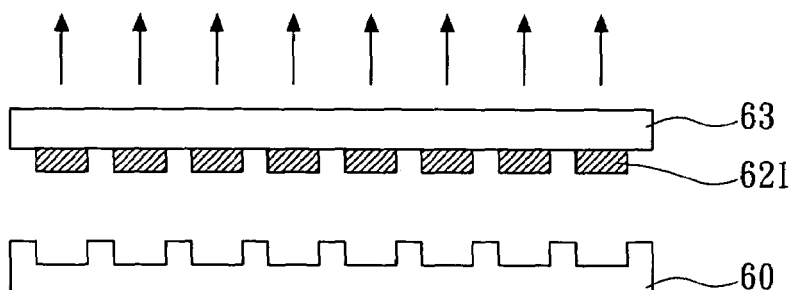
Figure 6D:
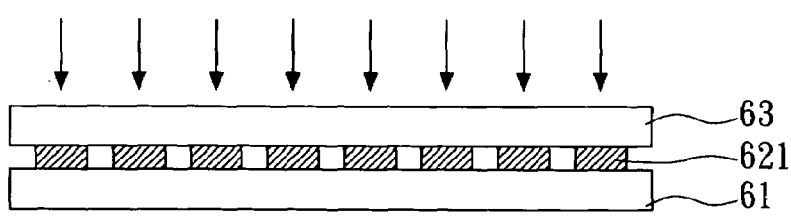
Figure 6E:
Figure 7A:
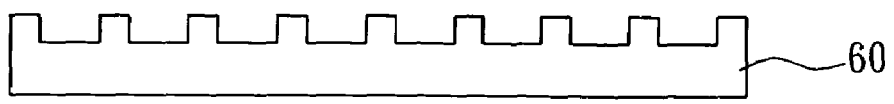
FIGS. 7A to D are illustrative views of the process of manufacturing cathode layers and gate extended layers by imprint of another embodiment of the present invention in use.
Figure 7B:
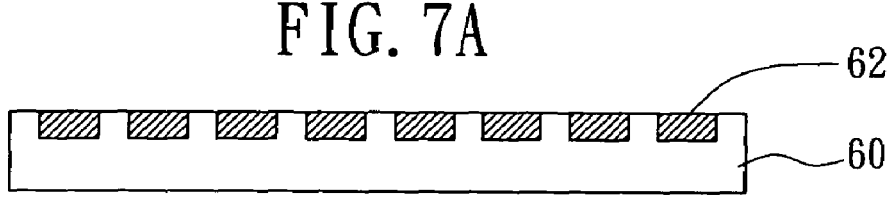
Figure 7C:
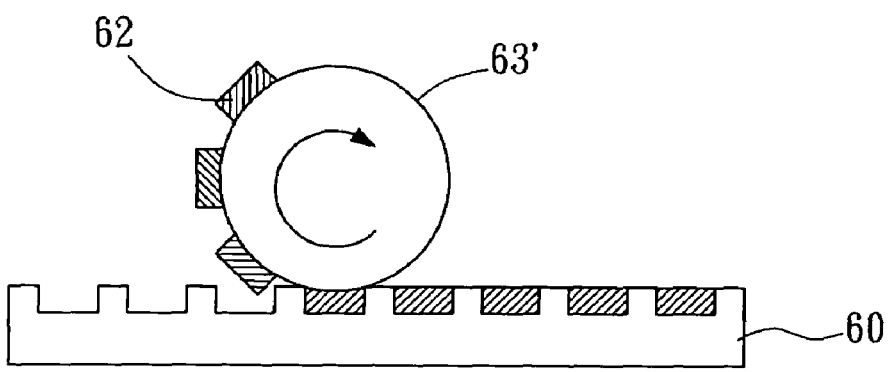
Figure 7D:
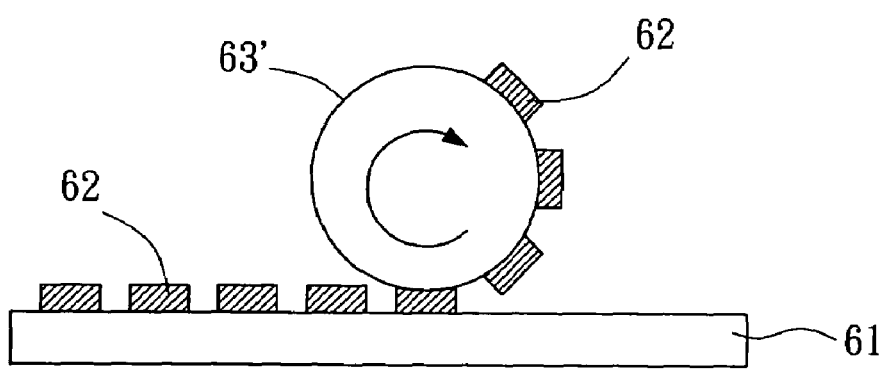

The preferred embodiment is shown in FIG. 4C. A plurality of trenches 431 are formed on a predetermined position of the surface of plastic dielectric layer 43 to place the gate electrodes 44 in a position to prevent a short caused by the gate electrodes' fall to the cathode layer 42.

Referring to FIG. 5A through FIG. 5E, the illustrative views of method of manufacturing the coplanar gate-cathode of triode CNT-FED of the best embodiment of the present invention are shown. The manufacturing method includes:

a. providing a substrate 51, b. forming a plurality of cathode layers 521 and gate extended layers 522 on the substrate 51 by imprint, wherein the cathode layers 521 and gate extended layers 522 are made of plastic materials, such as colloid composed of silver particles, c. forming a plastic dielectric layer 53 on the cathode layers 521 and gate extended layers 522, wherein the plastic dielectric layer 53 is made of plastic material, such as Polymenthyl methacrylate (PMMA), d. forming a plurality of dielectric openings 531 and a plurality of gate conducting wire conduits 532, wherein the dielectric openings 531 conduct to the surface of the cathode layers 521 and the conduits 532 conduct to the surface of the gate extended layers 522, e. filling the materials of CNT 54 in the bottom of the dielectric opening 531, f. forming a plurality of gate electrodes 55 on a predetermined region of the plastic dielectric layer 53 and the filling the same material as the gate electrodes 55 in the gate conducting wire conduits 532 by method from the group consisting of ink jet, imprint and screen print. The filling material can be the same material as gate extended layers 522. Thus, the gate electrodes 55 can connect to the gate extended layers 522 by the gate conducting wires conduits 532 to form the structure of coplanar gate-cathode of triode CNT-FED.

In another embodiment of this invention shown in FIG. 5A to FIG. 5G, at the same time of forming a plurality of dielectric openings 531 and a plurality of gate conducting wire conduits 532 in step (d), a plurality of trenches 533 are formed on the predetermined region of the dielectric layer 53 to place the gate electrodes 55 in.

In the step of forming cathode layers 521 and gate extended layers 522 by imprint shown in FIG. 6A to FIG. 6E in step (b), a moldboard is first provided on which some patterns are determined. A plastic conductive material 62, preferably colloid composed with silver particles, is coated on the surface of moldboard 61. A stencil member 63 is reached to the plastic conductive material 62 and then the plastic conductive material 62 is attached to the surface of the plastic conductive material 62 to form some plastic conductive plates 621 corresponding to the predetermined patterns. The plastic conductive plates 621 are printed to the substrate 61 to form the structure of coplanar gate-cathode of triode CNT-FED of the present invention.

In another embodiment of this invention shown in FIG. 7A to FIG. 7D, the stencil member used in the method of in step (b) can be a roller type. A moldboard 61 is provided on which some patterns are determined. A plastic conductive material 62 is coated on the surface of moldboard 61 and then is attached on the surface of moldboard 61 by the stencil member 63' of roller type. Thus, the predetermined patterns on the surface of stencil member 63' are stamped to the substrate 61 to form the structure of coplanar gate-cathode of triode CNT-FED of the present invention.

It is therefore understood that although the present invention has been specifically disclosed with the preferred embodiment and examples, modifications to the design concerning sizing and shape will be apparent to those skilled in the art and such modifications and variations are considered to be equivalent to and within the scope of the disclosed invention and the appended claims.

What is claimed is:

1. A structure of coplanar gate-cathode of triode CNT-FED including:
   a substrate,
   a plurality of cathode layers formed on said substrate,
   a plurality of gate extended layers formed on said substrate, wherein said cathode layers and said gate extended layers are coplanar,
   a plastic dielectric layer formed on said cathode layers and said gate extended layers,
   a plurality of dielectric openings, wherein said openings is formed from a plurality of trenches formed downward on the surface of said plastic dielectric layer, and the bottoms of dielectric openings reach the surface of cathode layer to fill the materials of CNT, and
   a plurality of gate electrodes formed on said plastic dielectric layer and extended to penetrate the inner part of said plastic dielectric layer to connect said gate extended layers separately.

2. The structure of claim 1, wherein predetermined positions on the surface of said plastic dielectric layer further comprises a plurality of trenches to place said gate electrodes in to prevent the short caused by said gate electrodes' fall to said cathode layer.

3. The structure of claim 1, wherein said cathode layer is made of colloid composed with silver particles.

4. The structure of claim 1, wherein said gate extended layer is made of colloid composed with silver particles.

5. The structure of claim 1, wherein said dielectric layer is made of Polymenthyl methacrylate (PMMA).

6. The structure of claim 1, wherein said gate electrode is made of colloid composed with silver particles.

* * * * *